(12) United States Patent
Li

(10) Patent No.: US 8,390,976 B2
(45) Date of Patent: Mar. 5, 2013

(54) LIGHTNING PROOF DEVICE FOR FILTER

(75) Inventor: Chun-Yi Li, Tainan (TW)

(73) Assignee: Soontai Tech Co., Ltd., Tainan (TW)

( * ) Notice: Subject to any disclaimer, the term of this patent is extended or adjusted under 35 U.S.C. 154(b) by 28 days.

(21) Appl. No.: 13/198,785

(22) Filed: Aug. 5, 2011

(65) Prior Publication Data

US 2013/0033795 A1 Feb. 7, 2013

(51) Int. Cl.
*H02H 1/00* (2006.01)
*H02H 1/04* (2006.01)
*H02H 3/22* (2006.01)
*H01C 7/12* (2006.01)

(52) U.S. Cl. .................. 361/117; 361/118; 361/119

(58) Field of Classification Search .............. 361/117
See application file for complete search history.

(56) References Cited

U.S. PATENT DOCUMENTS

| | | | | |
|---|---|---|---|---|
| 5,053,910 A | * | 10/1991 | Goldstein | 361/111 |
| 6,385,029 B1 | * | 5/2002 | Pennington | 361/111 |
| 8,027,136 B2 | * | 9/2011 | Penwell et al. | 361/119 |
| 8,179,656 B2 | * | 5/2012 | Jones et al. | 361/119 |
| 2005/0036262 A1 | * | 2/2005 | Siebenthall et al. | 361/118 |
| 2005/0248898 A1 | * | 11/2005 | Penington | 361/118 |
| 2011/0292557 A1 | * | 12/2011 | Penwell et al. | 361/118 |

* cited by examiner

*Primary Examiner* — Dharti Patel
(74) *Attorney, Agent, or Firm* — Rosenberg, Klein & Lee

(57) ABSTRACT

A lightning proof device for filter has a lightning proof device provided between a signal source input end and a filtering system of the filter. The lightning proof device has a first and a second metal inducing sheets opposite to each other, a filtering capacitor being provided corresponding to the first metal inducing sheet. The first metal inducing sheet is connected with the signal source input end of the filter and a first electrode end of the filtering capacitor, and a second electrode end of the filtering capacitor with the filtering system of the filter. The second metal inducing sheet is connected to the ground end. A gap is formed between the first and the second metal inducing sheets. In this manner, surge signal is absorbed and released by the gap in preliminary stage and the residual surge energy is filtered and de-energized by the filtering capacitor in final stage.

4 Claims, 4 Drawing Sheets

LIGHTNING PROOF DEVICE FOR FILTER

BACKGROUND OF INVENTION

1. Field of the Invention

The present invention relates to a lightning proof device for filter, more particularly to a novel lightning proof device for filter that can prevent damage of the electronic components contained in the filter from happening by surge pulse so as to achieve the object of protecting the filter and another electronic equipments connected therewith and to further increase its practical performance in the overall implementation.

2. Description of Related Art

Generation of surges is a natural phenomenon. When the intensity of the electric field set up between the accumulated atmospheric charged cloud and the ground exceeds a specific critical value, air insulation in some parts will be collapsed to cause the forming of a conductive path having large transient electric current contained therein. Hence, surges having high intensity will be induced at the input or output terminal of the electronic device near that conductive path. Furthermore, nuclear explosion electromagnetic wave triggered by solar nuclear explosion occurred during intense sunspots activity will also induce various surges of different intensity in the electronic circuit to negatively affect ground telecommunication. Moreover, surges carrying very strong energy can be transmitted in electromagnetic wave manner to a place with several hundred kilometers far away from the explosion point. In the process of its transmission, the electromagnetic wave will cause damage to electronic, information, electrical, optoelectronic, microwave equipments or the like.

As some electronic components in the electronic equipment are attacked by surges to cause damage (such as burn-out of insulation layer of semiconductor, integrated circuit or the like), the function of the overall equipment is brought into failure. This failure belongs to permanent damage so that the equipment can work no more without maintenance. Further, the energy of electromagnetic wave can enter into electronic circuit through exposed antenna, ground wire or the like so as to cause burn-out of electronic components, short circuit and furthermore, cause failure of various digital systems. These electromagnetic interference is introduced signals which causes failure symptoms such as malfunctions, abnormal operation latching and hence they belong to temporary disturbance without damaging components inside. Once the power source of the system is shut off and restarted, it will resume to normal operation.

Lightning induced surges, switching surges, electromagnetic pulse are the main sources causing malfunction, interference or failure of equipment. Generally, these surge interference sources invade through (a) power source line, (b) signal line (control line), (c) ground wire. If the equipment is in lack of capability of handling the surge energy and discharge current or uses improper method, it will inevitably suffer failure or interference. Therefore, surge suppressing components are usually added in various electronic equipment, communication equipment, control equipment and electrical equipment so as to reduce equipment failure or interference.

Among them, the general common structural design of surge suppression has a spiral coil connected to the end of an antenna body, and the other end of the spiral coil is grounded. When surges is generated by lightning or signals, the abnormal electrical signals triggered by lightning or surges is guided from the end of the antenna body to the spiral coil through one end thereof and is further guided to the ground section through the other end of the spiral coil so that the energy of the abnormal electrical signals can be guided to flow into the ground and further to protect the electronic equipment connected with the spiral coil.

The inventor of the present invention proposes a novel lightning proof device for filter according to the research and improvement conducted on conventional structure, based on profound experience in R&D and manufacturing in relevant field, so as to achieve the goal of better practical value and to provide more diversification for consumers to choose.

SUMMARY OF THE INVENTION

The lightning proof device for filter according to the present invention mainly has a lightning proof device provided between a signal source input end and a filtering system both contained in the filter. The lightning proof device has a first and a second metal inducing sheets opposite to each other, a filtering capacitor being provided corresponding to the first metal inducing sheet. The first metal inducing sheet is connected with the signal source input end of the filter and a first electrode end of the filtering capacitor, and a second electrode end of the filtering capacitor is connected with the filtering system of the filter. The second metal inducing sheet is connected to the ground end. There is no connection between the first metal inducing sheet and the second metal inducing sheet; hence a gap is formed therebetween. Configuring in this manner, surge signal is absorbed and released by the gap formed between the first metal inducing sheet and the second metal inducing sheet in preliminary stage and the residual surge energy is filtered and de-energized by the filtering capacitor in final stage, so that the electronic parts inside the filter can be prevented from damaging by the surge signal. Hence, the goal of protecting the functions of the filter and the other electronic equipments connected therewith can be achieved, and convenience in practical usage is further increased in its overall implementation.

DETAILED DESCRIPTION OF THE PREFERRED EMBODIMENTS

The objects, the technical contents and the expected effectiveness of the present invention will become more apparent from the detailed description of the preferred embodiment in conjunction with the accompanying drawings.

Figure 1:
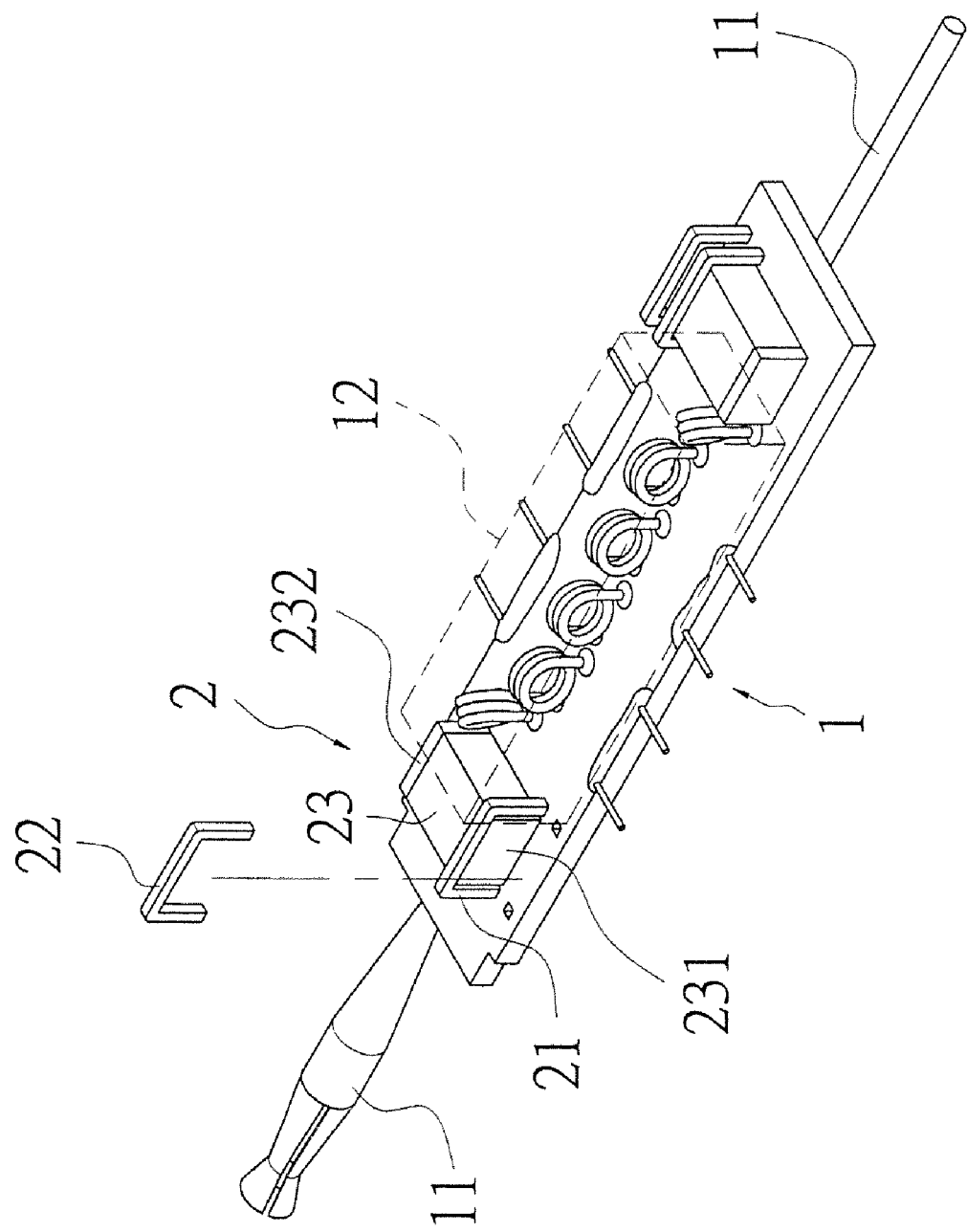
FIG. 1 is a perspective exploded structural view of the present invention.
Figure 2:
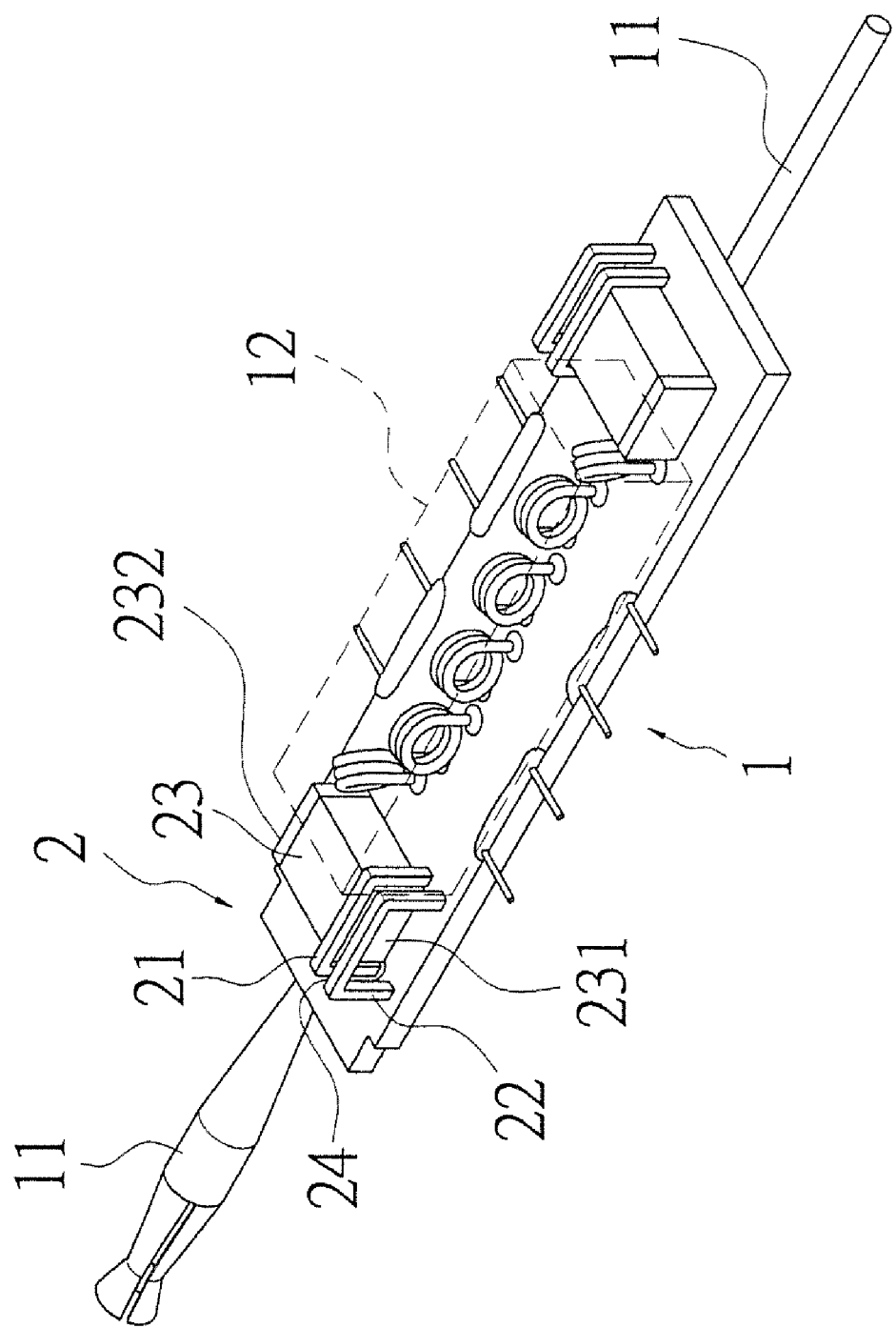
FIG. 2 is a perspective assembled structural view of the present invention.

FIG. 1 is a perspective exploded structural view of the present invention, and FIG. 2 is a perspective assembled structural view of the present invention. Firstly referring to FIGS. 1 and 2, the lightning proof device for filter of the present invention is mainly provided with a signal source input end (ends) (11) at one side or several sides of the filter (1), and with a filtering system (12) at the filter (1). A lightning proof device (2) is provided between the signal source input end (11) and the filtering system (12).

Figure 3:
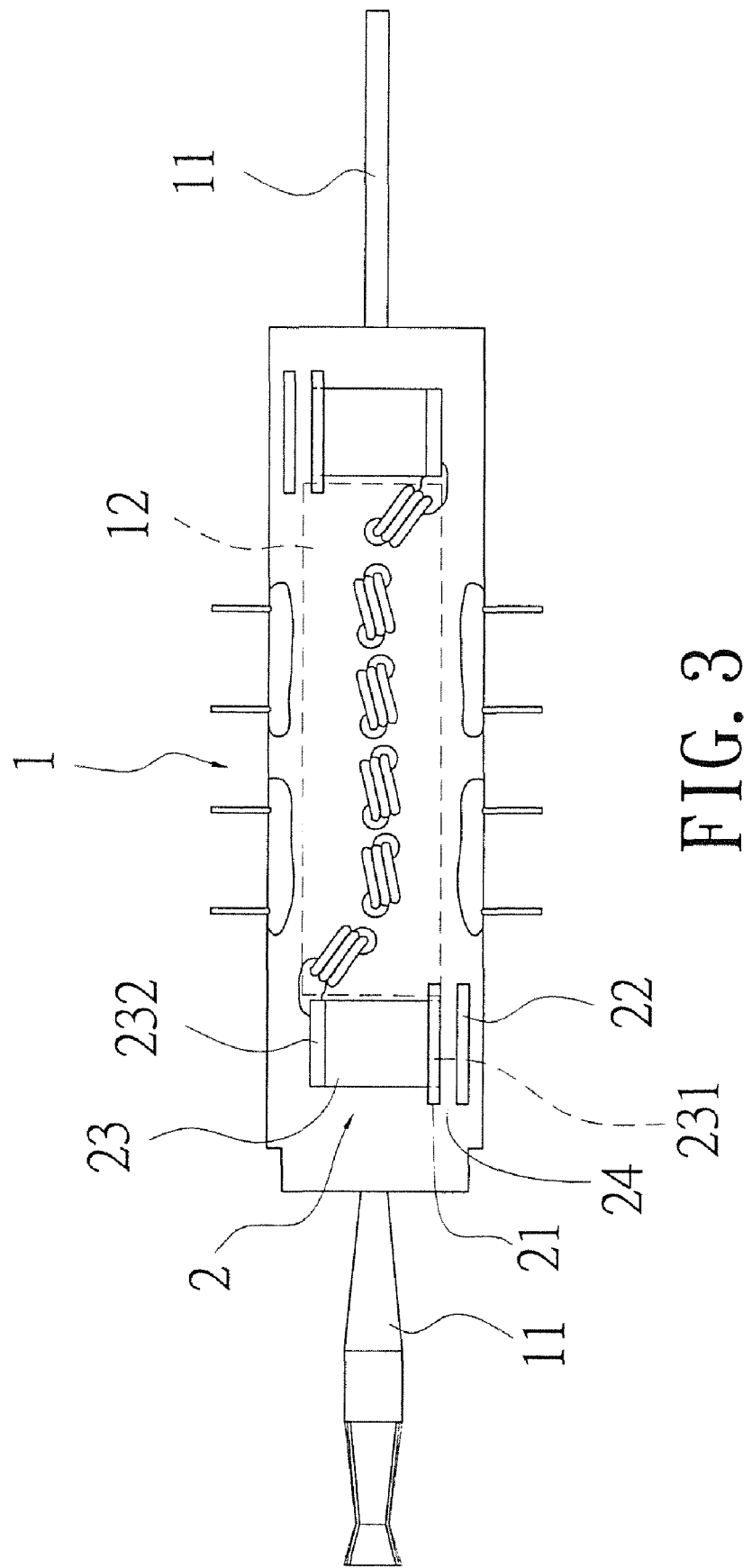
FIG. 3 is an assembled structural top view of the present invention.

The lightning proof device (2) has a first metal inducing sheet (21) and a second metal inducing sheet (22) opposite to each other, a filtering capacitor (23) being provided corresponding to the first metal inducing sheet (21). The first metal inducing sheet (21) is connected with the signal source input end (11) of the filter (1) and a first electrode end (231) of the filtering capacitor (23), and a second electrode end (232) of the filtering capacitor (23) is connected with the filtering system (12) of the filter (1). The second metal inducing sheet (22) is connected to the ground end. There is no connection between the first metal inducing sheet (21) and the second metal inducing sheet (22), hence a gap (24) having a size of about 0.1 to 2.0 mm is formed therebetween (also referring to FIG. 3, the assembled structural top view of the present invention).

Figure 4:
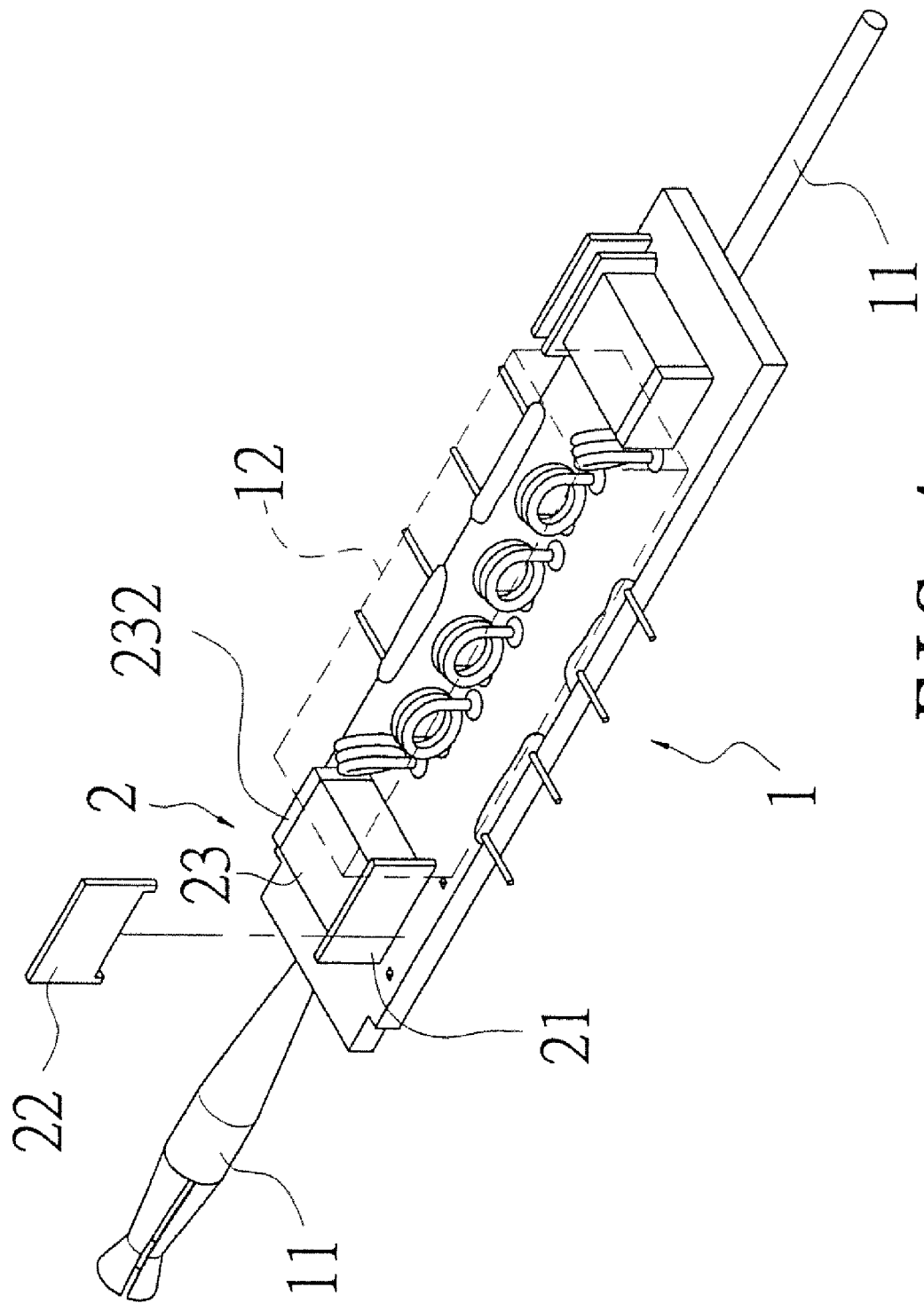
FIG. 4 is a perspective exploded structural view of another embodiment of the present invention.

Further, the first metal inducing sheet (21) and the second metal inducing sheet (22) of the lightning proof device (2) of the present invention are U-shaped sheets arranged opposite to each other. As shown in FIG. 4, the first metal inducing sheet (21) and the second metal inducing sheet (22) can also be flat sheets arranged opposite to each other.

In this manner, when input of surge signals into the signal source input end (11) is encountered, the surge signals is absorbed and released by the gap (24) formed between the first metal inducing sheet (21) and the second metal inducing sheet (22) in preliminary stage and the residual surge energy is filtered and de-energized by the filtering capacitor (23) in final stage, so that the filtering system (12) inside the filter (1) can be prevented from damaging by the surge signals. Hence, the goal of protecting the functions of the filter (1) and the other electronic equipments connected therewith can be achieved.

Based on foregoing, it is apparent from the structural constitution and implementation embodiment of the present invention that, when comparing to the conventional structure, the present invention has the advantages described below. As the first metal inducing sheet is connected with the signal source input end of the filter and a first electrode end of the filtering capacitor, and the second electrode end of the filtering capacitor is connected with the filtering system of the filter; the second metal inducing sheet being connected to the ground end; no connection being present between the first metal inducing sheet and the second metal inducing sheet, hence a gap being formed therebetween, surge signal is absorbed and released by the gap formed between the first metal inducing sheet and the second metal inducing sheet in preliminary stage and the residual surge energy is filtered and de-energized by the filtering capacitor in final stage, so that the electronic parts inside the filter can be prevented from damaging by the surge signals. Hence, the goal of protecting the functions of the filter and the other electronic equipments connected therewith can be achieved.

The aforementioned embodiment or drawings are not intended to restrict the aspect of the present invention. Appropriate modifications or variations conducted by person having general knowledge in this art by referring to the context of the present invention should be considered to be still within the scope of the present invention.

What is claimed is:

1. A lightning proof device for filter, having a lightning proof device provided between a signal source input end and a filtering system contained in the filter, wherein said lightning proof device comprises a first metal inducing sheet and a second metal inducing sheet opposite to each other, a filtering capacitor being provided corresponding to said first metal inducing sheet; said first metal inducing sheet being connected with said signal source input end of said filter and a first electrode end of said filtering capacitor, and a second electrode end of said filtering capacitor being connected with said filtering system of the filter; said second metal inducing sheet being connected to the ground end; no connection being provided between said first metal inducing sheet and said second metal inducing sheet so that a gap is formed therebetween.

2. The lightning proof device for filter as claimed in claim 1, wherein the size of said gap is 0.1 to 2.0 mm.

3. The lightning proof device for filter as claimed in claim 1, wherein said first metal inducing sheet and said second metal inducing sheet are U type sheets opposite to each other.

4. The lightning proof device for filter as claimed in claim 1, wherein said first metal inducing sheet and said second metal inducing sheet of said lightning proof device are flat sheets opposite to each other.

* * * * *